Patented May 25, 1954

2,679,501

UNITED STATES PATENT OFFICE 2,679,501

AMINO DERIVATIVES OF 2-SUBSTITUTED-4-TERT. BUTYLPHENOL ETHERS

Wilhelm Wenner, Montclair, N. J., assignor to Hoffmann-La Roche Inc., Nutley, N. J., a corporation of New Jersey No Drawing. Application June 23, 1950, Serial No. 170,031

7 Claims. (Cl. 260—294.7)

This invention relates to amino derivatives of 2-substituted-4-tert.butylphenols, and more particularly to 2 - substituted - 4 - tert.butylphenol β-aminoethyl ethers and the salts thereof, wherein the 2-substituent is a member of the group consisting of methyl, phenyl and halogen, for example, chlorine or bromine; and wherein the β-amino radical is a member of the group consisting of dimethylamino, diethylamino, cyclohexylamino, piperidino and benzylamino. Compounds of the present invention are useful in the fields of fungicides and trichomonacides.

The compounds can be represented by the following formula:

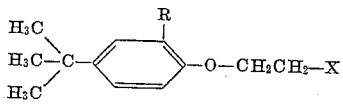

wherein R represents the "2-substituent" and X the "β-amino radical," as hereinabove defined.

According to one procedure, the new compounds can be prepared by reacting a 2-substituted-4-tert.butylphenol with a β-aminoethyl halide, such as a β-aminoethyl chloride or a β-aminoethyl bromide, wherein the 2-substituent and the β-amino radical have the same significance already assigned thereto. Thus, for example, 2-bromo-4-tert.butylphenol condenses readily with β-diethylamino-ethylchloride to form 2-bromo-4-tert.butylphenol β - diethylaminoethyl ether. The condensation is preferably carried out in the presence of a solvent, for example, ethanol or methanol, and in the presence of one equivalent of an alkali alcoholate, such as sodium methylate or sodium ethylate. The reaction readily proceeds at slightly elevated temperatures, reflux temperature of the solvent being preferred.

According to another procedure, the 2-substituted-4-tert.butylphenol β-aminoethyl ethers can be prepared by reacting a 2-substituted-4-tert.butylphenol β-halogenethyl ether, wherein the 2-substituent is the same as already defined above and the halogen can be, for example, chlorine or bromine, with cyclohexylamine, benzylamine, dimethylamine, diethylamine, or piperdine. Thus, for example, 4-tert. butyl-2-chlorophenol β-chloroethyl ether readily condenses with benzylamine to form 4-tert. butyl-2-chlorophenol β-benzylaminoethyl ether. The reaction may be carried out in the absence of a solvent by heating mixtures of the components together. The optimum reaction temperature depends upon the ease of reaction in each specific case. It has been found advantageous to employ reflux temperatures of the particular amine used in most cases where the boiling point of the amine is not higher than approximately 150° C. With low boiling amines, such as dimethylamine, it is advantageous, although not necessary, to carry out the reaction in a closed vessel. While a solvent is not necessary, the presence thereof enables the more convenient handling of the reaction mixtures. It is preferred to employ two equivalents of the amine for each equivalent of the 2-substituted-4-tert. butylphenol β-halogenethyl ether, the second equivalent of the amine serving as an acid-acceptor or binding agent for the hydrohalic acid formed in the reaction.

The new 2-substituted-4-tert. butylphenol β-aminoethyl ethers are generally liquids. They can be purified by distillation, particularly in the case of compounds of low molecular weight, or by conversion into salts which can be crystallized. The free bases are practically insoluble in water but are soluble in most common organic solvents. The salts are soluble in water, the degree of solubility depending upon the acid used for salt formation and upon the type of amino groups. When the latter are of high molecular weight, such as benzylamino or cyclohexylamino, the solubility of the salts in water is relatively low, but these salts are quite soluble in organic solvents, and some of them even in benzene.

EXAMPLE 1

*2-chloro-4-tert. butylphenol β-diethylaminoethyl ether*

25 grams of 4-tert. butyl-2,β-dichlorophenetol and 15 grams of diethylamine were heated to 100–110° C. for 24 hours in bomb-tube. Ether was added and the crystals which formed were filtered. The ether solution was evaporated. The residue was distilled in vacuo, yielding pure 2-chloro-4-tert. butylphenol β-diethylaminoethyl ether of B. P. 175–180° C./10 mm. as a colorless liquid.

EXAMPLE 2

*2-chloro-4-tert.butylphenol β-cyclohexylaminoethyl ether*

20 grams of 4-tert.butyl-2,β-dichlorophenetol and 16 grams of cyclohexylamine were heated on a steam-bath to 90–95° C. for 10 hours. After cooling, 200 cc. of ether were added. The crystals of cyclohexylamine hydrochloride were filtered. The filtrate was treated with an excess of 10% hydrochloric acid, whereby 2-chloro-4-tert.butylphenol β-cyclohexylaminoethyl ether hydrochloride precipitated. The material was filtered and recrystallized from hot water. The pure hydrochloride melted at approximately 153–155° C.

EXAMPLE 3

*2-chloro-4-tert.butylphenol β-benzylaminoethyl ether*

20 grams of 4-tert.butyl-2,β-dichlorophenetol and 18 grams of benzylamine were heated to 90–100° C. for 24 hours. Benzylamine hydrochloride formed. It was filtered and washed with benzene (about 300 cc.). The filtrate was extracted with water to remove the excess of benzylamine. It was then stirred with an excess of 5% aqueous hydrochloric acid. The hydrochloride of the 2-chloro - 4 - tert.butylphenol β-benzylaminoethyl ether formed. The main amount remained dissolved in the benzene layer. The benzene solution was separated and concentrated to about 150 cc. Three volumes of ether were added. On standing, the hydrochloride of 2-chloro-4-tert. butylphenol β-benzylaminoethyl ether crystallized. It was filtered. Recrystallization from hot water yielded the pure compound of M. P. 141–142° C.

EXAMPLE 4

*2-phenyl-4-tert.butylphenol β-(1-piperidyl) ethyl ether*

3 grams of sodium methylate in 90 cc. of alcohol were added to 11.3 grams of 4-tert.butyl-2-phenylphenol in 100 cc. benzene, and the solution was heated for 1½ hours with stirring. Over a 10-minute period 8.5 grams of N-β-chloroethyl-piperidine in 335 cc. of benzene were dropped into the reaction mixture and refluxing continued for 5 hours. To the cooled solution, 150 cc. of water and 50 cc. of ether were added, the layers separated, and the organic solution washed four times with 5–10% aqueous hydrochloric acid. The benzene layer was then distilled to dryness, and the solid residue was taken up in 100 cc. of water. The aqueous solution was alkalized with concentrated ammonia, and the precipitated 2-phenyl- 4 -tert.butylphenol β-(1-piperidyl) ethyl ether was taken up in ether. After the ether solution had been dried over anhydrous potassium carbonate, 6 grams of citric acid in 10 cc. of alcohol were added. The resultant solid citrate was recrystallized from 175 cc. of water to give the citrate of 2-phenyl-4-tert.butylphenol β-(1-piperidyl) ethyl ether, M. P. 139–141° C.

EXAMPLE 5

*2-methyl-4-tert.butylphenol β-dimethylaminoethyl ether*

8.2 grams of p-tert.butyl-o-cresol in 100 cc. of benzene and 3 grams of sodium methylate in 90 cc. of alcohol were refluxed together for ¾ hour. 6.2 grams of β-dimethylaminoethylchloride in 250 cc. of benzene were added over a 25 minute period, and the mixture refluxed for 5 hours. 150 cc. of water and 125 cc. of ether were added, and the layers separated. The organic layer was extracted four times with 5% hydrochloric acid, and the aqueous acid extracts were combined and alkalized with concentrated ammonia. The precipitated 2-methyl-4-tert.butylphenol β-dimethylaminoethyl ether was extracted with ether, and the ether solution dried with anhydrous potassium carbonate and acidified with 16% alcoholic hydrobromic acid. The hydrobromide of 2-methyl - 4 - tert.butylphenol β - dimethylaminoethyl ether was recrystallized from 600 cc. of ethyl acetate, with the addition of 5 cc. of ethanol, M. P. 166.5–168.5° C.

I claim:

1. A compound selected from the group consisting of 2-phenyl-4-tert.butylphenol β - (1-piperidyl) ethyl ether, 2-chloro - 4 - tert.butylphenol β-benzylaminoethyl ether, 2-chloro-4-tert.butylphenol β-cyclohexylaminoethyl ether, 2-methyl-4-tert.butylphenol β - dimethylaminoethyl ether, and 2-chloro-4-tert.butylphenol β-diethylaminoethyl ether.

2. 2-phenyl - 4 - tert.butylphenol β-(1-piperidyl) ethyl ether.

3. 2-chloro-4-tert.butylphenol β-benzylaminoethyl ether.

4. 2-chloro - 4 - tert.butylphenol β-cyclohexylaminoethyl ether.

5. 2-methyl - 4 - tert.butylphenol β-dimethylaminoethyl ether.

6. 2-chloro-4-tert.butylphenol β-diethylaminoethylether.

7. The process which comprises reacting 4-tert.butyl - 2,β - dichlorophenetol with diethylamine so as to produce 2-chloro-4-tert.butylphenol β-diethylaminoethyl ether.

References Cited in the file of this patent

UNITED STATES PATENTS

| Number | Name | Date |
| --- | --- | --- |
| 2,132,674 | Bruson | Oct. 11, 1938 |
| 2,170,111 | Bruson | Aug. 22, 1939 |
| 2,209,911 | Bruson | July 30, 1940 |

FOREIGN PATENTS

| Number | Country | Date |
| --- | --- | --- |
| 240,141 | Switzerland | May 16, 1946 |